Patented June 10, 1930

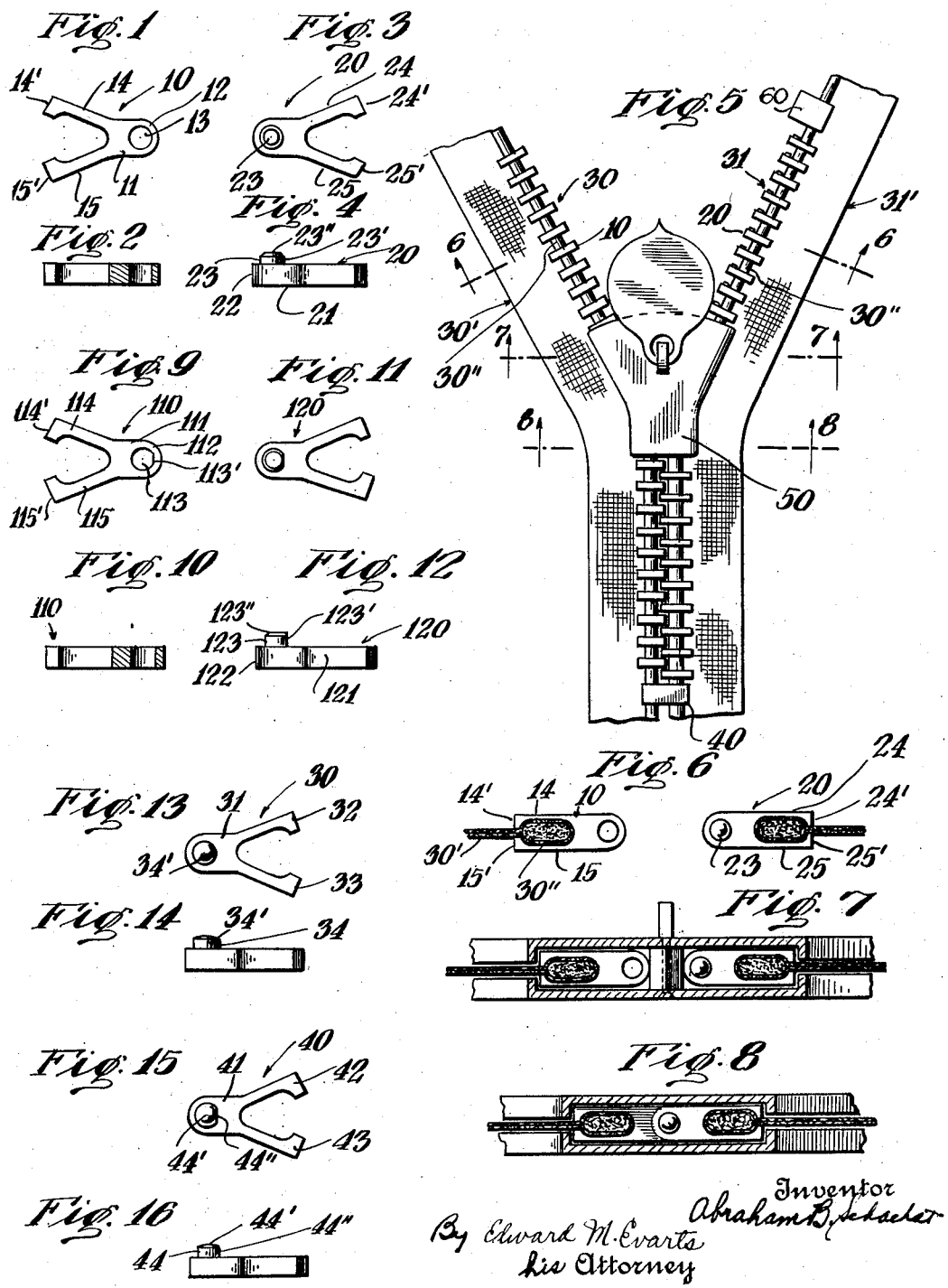

1,763,186

UNITED STATES PATENT OFFICE

ABRAHAM B. SCHACHAT, OF NEW YORK, N. Y., ASSIGNOR TO NOEL STATHAM, OF IRVINGTON-ON-HUDSON, NEW YORK

SLIDE-OPERABLE FASTENING DEVICE

Application filed April 26, 1928. Serial No. 272,945.

My present invention relates to fastener elements, particularly such as are intended for use in automatic or key-operable flexible fastening devices, and relates also to the automatic or key-operable fastening devices embodying such fastener elements, and aims to devise fastener elements which are simple in construction, which may be readily, conveniently and economically fabricated, and the automatic or key-operable flexible fastener devices embodying which are simple in construction, easy, convenient and economical to fabricate and to assemble, and which are highly satisfactory and efficient in operation. Other objects and advantages of the devices of the present invention will in part be pointed out in detail hereinafter and will in part be obvious to those skilled in the art to which the present invention relates.

In the accompanying specification I shall describe, and in the annexed drawings show, several illustrative embodiments of the present invention. It is, however, to be clearly understood that my invention is not limited to the specific embodiments thereof herein shown and described for purposes of illustration only.

Referring to the drawing, wherein I have illustrated the aforesaid illustrative embodiments of the present invention:

Fig. 1 is a plan view and Fig. 2 a longitudinal section of one form of female fastener element forming a part of one of the aforesaid illustrative embodiments of the present invention;

Fig. 3 is a plan view and Fig. 4 a side elevation of one form of male fastener element adapted to cooperate with the form of female fastener element shown in Figs. 1 and 2 of the drawing;

Fig. 5 is a plan view of the assembled fastener-supporting elements, the male and female fasteners carried thereby, and the key for operating the same;

Fig. 6 is a cross sectional view of the same taken along 6—6 of Fig. 5 of the drawing;

Fig. 7 is a cross sectional view of the same taken along line 7—7 of Fig. 5 of the drawing;

Fig. 8 is a cross sectional view of the same taken along 8—8 of Fig. 5 of the drawing;

Fig. 9 is a plan view and Fig. 10 a longitudinal sectional view of another form of female fastener element forming a part of the remaining one of the aforesaid illustrative embodiments of the present invention; and Fig. 11 is a plan view and Fig. 12 is a side elevational view of another form of male fastener element adapted to cooperate with the female form of fastener element shown in Figs. 9 and 10 of the drawing and constituting a part of the remaining one of the aforesaid illustrative embodiments of the present invention.

Referring to Figs. 13, 14, 15 and 16 of the drawing:

Fig. 13 is a plan view; and

Fig. 14 is an edge view of another form of male fastener element; and

Fig. 15 is a plan view; and

Fig. 16 is an edge view of still another form of male fastener element.

Referring now to the aforesaid illustrative embodiments of the present invention, and more particularly to the drawing illustrating the same, and with special reference to the form of the invention shown in Figs. 1 to 8, inclusive, of the drawing, the female fastener element illustrated in Figs. 1 and 2 of the drawing and generally designated by reference character 10 comprises a main body portion 11 having the fastener portion 12 provided with a substantially cylindrical aperture 13 at one end thereof. At its other end the main body portion 11 is provided with the jaw members 14 and 15 having the clamping portions 14' and 15' between which is received the beaded or other edge of the flexible supporting tape in clamping position, as will be subsequently described in considerable detail herein.

The male fastener element 20 shown in Figs. 3 and 4 of the drawing comprises a main body portion 21 having the fastener portion 22 at one end thereof provided with the projection 23. The projection 23 includes the lower substantially cylindrical portion 23' and the upper substantially frusto-conical portion 23''. At its other end the main body portion 21 is provided with the jaw members 24 and 25 having the clamping portions 24′ and 25′, respectively. It will thus be noted that the top 23″ of the projection 23 is in the nature of a beveled portion.

I provide a plurality of stringers 30 and 31 which may consist of the tapes 30′ and 31′ having the beaded edge portions 30″ and 31″, respectively. The stringer 30 may carry a series of the female fastener elements 10 with the clamping portions 14′ and 15′ of the jaw members 14 and 15, respectively, clamped about the beaded edge 30″ of the tape 30′. The stringer 31, on the other hand, may carry a series of cooperating male fastener elements 20 having the clamping portions 24′ and 25′ of the jaw members 24 and 25, respectively, clamped about the beaded edge 31″ of the tape 31′. 40 indicates a rivet or staple which serves as a lower stop for the key or operating member 50, 60 indicating an upper staple or rivet serving as a stop for the key in its uppermost movement when the flexible fastening device is in its upper or closed position. The key 50 may be of any suitable type of construction, being adapted in one direction of its movement along the cooperating stringers 30 and 31 to close the flexible fastening device embodying such stringers and in the opposite direction of its movement along the cooperating stringers to open the flexible fastening device.

This completes the description of the aforesaid illustrative embodiment of the present invention illustrated in Figs. 1 to 8, inclusive, of the drawing. It will be noted that such embodiment is simple in construction and may be readily, conveniently and economically fabricated and assembled. It will be noted also that the device is convenient in operation and may be conveniently used, being easily operated from open into closed and from closed into open position. Other advantages and superiorities of the form of the invention illustrated in Figs. 1 to 8, inclusive, of the drawing will readily occur to those skilled in the art to which the present invention relates.

Referring now to the form of invention illustrated in Figs. 9 to 12, inclusive, of the drawing, the female fastener element shown in Figs. 9 to 10 of the drawing and there indicated by reference character 110 comprises the main body portion 111 having the fastener portion 112 adjacent one end thereof. The fastener portion 112 is provided with the aperture 113 which is substantially cylindrical but is provided adjacent the inner end thereof with the substantially flat or engaging locking surface 113′. At its other end the female fastener element 110 provided with the jaws 114 and 115 having the clamping or locking portions 114′ and 115′, respectively.

The cooperating male fastener element, illustrated in Figs. 11 and 12 of the drawing, and there generally designated by reference character 20, comprises the main body portion 121 having the fastener portion 122 at one end thereof. The fastener portion 122 is provided with the projection 123 having the lower portion 123′ and the upper substantially frustoconical portion 123″. The lower portion 123′ of the projection 123 is provided with an upper flattened or engaging locking portion 123″ for engagement with the correspondingly flattened engaging locking portion 113′ of the female fastener element 110.

Accordingly, the automatic fastening devices of the present invention, embodying the female and male fastener elements illustrated in Figs. 9 and 10, and Figs. 11 and 12, respectively, of the drawing, will not be capable of having an angular or pivoted movement of the two stringers with respect to each other, as is the case with the form of automatic fastener and the female and male fastener elements embodied therein illustrated in Figs. 1 to 8, inclusive, of the drawing.

Due to the provision of the lower substantially cylindrical portions 23 and 123, respectively, of the two types of male fastener elements illustrated in the annexed drawings, and the corresponding forms of the apertures 13 and 113 of the corresponding female fastener elements, the various elements will be securely locked in position in the closed position of such elements. At the same time, the provision of the upper frustoconical or bevelled portions 23″ and 123″ of the two forms of male fastener elements illustrated in the annexed drawings will permit the ready engagement and the equally ready disengagement of the male from the corresponding female elements in the locking and unlocking movements, respectively, of the automatic fastening devices in which such fastener elements are embodied.

Other superiorities and advantages of the devices of the present invention will readily occur to those skilled in the art to which the present invention relates.

It may here be stated that in Figs. 13 and 14 I have shown another form and in Figs. 15 and 16 I have shown still another form of male fastener element which may be successfully used with the devices of the present invention. As shown in Figs. 13 and 14 of the drawing, the male fastener element, generally designated by reference character 30, comprises the main body portion 31 and the clamping jaws 32 and 33. 34 indicates a substantially cylindrical projection having the rounded top 34′. This form of male fastener element presents certain advantages in construction in certain types of slide-operable fastening devices.

In Figs. 15 and 16 of the drawing, the male fastener element, there indicated by reference character 40′, comprises the main body portion 41 and the clamping jaws 42 and 43. 44 comprises a substantially cylindrical projection having the rounded top 44' and the flattened face 44''. This type of male fastener element presents many superiorities over certain types of slide-operable fastening elements.

What I claim as my invention is:

1. A male fastener element for automatic, flexible fasteners and the like, comprising a fastener portion provided with a substantially cylindrical projection, said substantially cylindrical projection being provided with a substantially frusto-conical reduced end portion.

2. A male fastener element for automatic, flexible fasteners and the like, comprising a body portion having a fastener portion provided with a substantially cylindrical projection adjacent one end thereof and a plurality of clamping portions adjacent the other end thereof, said substantially cylindrical projection being provided with a substantially frusto-conical reduced end portion.

3. In an automatic flexible fastening device a flexible fastener-supporting tape carrying a series of male fastener elements each comprising a fastener portion provided with a substantially cylindrical projection, said substantially cylindrical projection being provided with a substantially frusto-conical reduced end portion.

4. In an automatic flexible fastening device a flexible fastener-supporting tape carrying a series of male fastener elements each comprising a body portion having a fastener portion provided with a substantially cylindrical projection adjacent one end thereof and a plurality of clamping portions adjacent the other end thereof, said substantially cylindrical projection being provided with a substantially frusto-conical reduced end portion.

5. A flexible, key-operable fastener device comprising a flexible fastener-supporting tape carrying a series of male fastener elements each comprising a fastener portion provided with a substantially cylindrical projection, said substantially cylindrical projection being provided with a substantially frusto-conical reduced end portion, in combination with a cooperating flexible fastener-supporting tape carrying a series of cooperating female fastener elements each comprising a body portion having a fastener portion provided with a substantially cylindrical aperture adjacent one end thereof and a plurality of clamping portions adjacent the other end thereof.

6. A flexible, key-operable fastener device comprising a flexible fastener-supporting tape carrying a series of male fastener elements each comprising a fastener portion provided with a substantially cylindrical projection, said substantially cylindrical projection being provided with a reduced end portion, in combination with a cooperating flexible fastener-supporting tape carrying a series of cooperating female fastener elements each comprising a body portion having a fastener portion provided with a substantially cylindrical aperture adjacent one end thereof and a plurality of clamping portions adjacent the other end thereof.

7. A flexible, key-operable fastener device comprising a flexible fastener-supporting tape carrying a series of male fastener elements each comprising a body portion having a fastener portion provided with a substantially cylindrical projection adjacent one end thereof and a plurality of clamping portions adjacent the other end thereof, said substantially cylindrical projection being provided with a substantially frusto-conical reduced end portion, in combination with a cooperating flexible fastener-supporting tape carrying a series of cooperating female fastener elements each comprising a body portion having a fastener portion provided with a substantially cylindrical aperture adjacent one end thereof and a plurality of clamping portions adjacent the other end thereof.

8. A flexible, key-operable fastener device comprising a flexible fastener-supporting tape carrying a series of male fastener elements each comprising a body portion having a fastener portion provided with a substantially cylindrical projection adjacent one end thereof and a plurality of clamping portions adjacent the other end thereof, said substantially cylindrical projection being provided with a reduced end portion, in combination with a cooperating flexible fastener-supporting tape carrying a series of cooperating female fastener elements each comprising a body portion having a fastener portion provided with a substantially cylindrical aperture adjacent one end thereof and a plurality of clamping portions adjacent the other end thereof.

In testimony whereof, I have signed my name to this specification this 16th day of April, 1928.

ABRAHAM B. SCHACHAT.